United States Patent
Jiang et al.

(10) Patent No.: US 8,605,839 B2
(45) Date of Patent: Dec. 10, 2013

(54) SYSTEM AND METHOD FOR REDUCING POWER CONSUMPTION IN A FLO-EV RECEIVER

(75) Inventors: Jing Jiang, San Diego, CA (US); Raghuraman Krishnamoorhi, San Diego, CA (US); Krishna K. Mukkavilli, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 12/887,216

(22) Filed: Sep. 21, 2010

(65) Prior Publication Data

US 2012/0069934 A1    Mar. 22, 2012

(51) Int. Cl.
*H03D 1/04*    (2006.01)
(52) U.S. Cl.
USPC ........... 375/346; 375/316; 375/340; 375/342; 714/786
(58) Field of Classification Search
USPC ................ 375/346, 316, 340, 342; 714/786
See application file for complete search history.

(56) References Cited

U.S. PATENT DOCUMENTS

2007/0300139 A1\* 12/2007 Pisek et al. .................... 714/794
2010/0223524 A1   9/2010 Duggan et al.
2010/0223534 A1   9/2010 Earnshaw et al.

FOREIGN PATENT DOCUMENTS

| EP | 1499059 A1 | 1/2005 |
| WO | WO0230004 A2 | 4/2002 |
| WO | WO2007086696 A1 | 8/2007 |

OTHER PUBLICATIONS

International Search Report and Written Opinion—PCT/US2011/049603, ISA/EPO—Oct. 13, 2011.

\* cited by examiner

*Primary Examiner* — Zewdu Kassa
(74) *Attorney, Agent, or Firm* — Fulbright & Jaworski LLP (57) ABSTRACT

A method for exiting receiver processing in a FLO-EV receiver comprises receiving a communication signal comprising at least one received symbol, deriving a channel performance metric based on the received symbol, determining whether the metric exceeds a threshold, and when the metric exceeds the threshold, providing a logic signal to signal receiver processing cessation.

32 Claims, 11 Drawing Sheets

SYSTEM AND METHOD FOR REDUCING POWER CONSUMPTION IN A FLO-EV RECEIVER

BACKGROUND

The continued development and implementation of wireless communications systems has made it possible to transmit a large amount of data over a radio frequency (RF) air interface. There are a number of technologies that can be used to broadcast video and other programming from a central location to a receiver device. Forward Link Only (FLO) is an example of a transmission methodology that uses a radio frequency (RF) air interface to broadcast video and other programming from one or more central locations to one or more receiver devices. The basic structure of a packet in FLO is referred to as a "superframe." A superframe contains 1200 orthogonal frequency division multiplexed (OFDM) data symbols and has a duration of one (1) second. A superframe contains pilot, control and data frames. Typically, four data frames, each containing one or both of wide-area and local-area data are part of a superframe. Because the receiver device is typically powered by a small, rechargeable power source, such as a battery, power conservation and the overall minimization of power consumption are highly desirable.

One of the ways to minimize power consumption in a FLO system is referred to as "early exit." The amount of processing performed on the received signal by the portable receiver is variable, based on a number of different attributes of the received signal, and other parameters. The term "early exit" refers to minimizing the amount of processing performed on a received signal by "exiting" the receiver processing function prior to decoding all of the received data. For example, in the current FLO system, turbo packets are decoded upon arrival. After turbo decoding (TD), a cyclic redundancy check (CRC) is performed to determine whether the turbo packet has been successfully decoded. When a Reed-Solomon (RS) code having a (16, 12) format is adopted as an outer code in FLO, systematic turbo packets will be scheduled in frames 1 to 3 and frame 4 contains all RS coded parity packets. As a result, at the end of frame 3, if all systematic turbo packets are decoded, there is no need to get RS coded parity packets in frame 4 and the receiver processing can be terminated early (referred to as early exit) to save power and to reduce channel switching time.

The FLO methodology has been improved to increase bandwidth and data carrying capability. The enhanced FLO system is referred to as FLO-EV. In FLO-EV, a long turbo codeword (LTC) is interleaved across frames in one superframe. If one frame is missing, the LTC can be viewed as a randomly punctured turbo code of a higher rate. Therefore, as long as the punctured turbo code rate is less than 1, the superframe is still decodable without frame 4 under high signal-to-noise ratio (SNR) conditions. For some modes, a punctured LTC could be decodable even without frame 3 and 4. An early exit methodology for FLO-EV has greater flexibility than for FLO since it is not limited by the outer RS code rate. For example, in FLO, early exit is not possible when a RS code of (16, 14) is used. Moreover, a punctured LTC in FLO-EV still captures time diversity of 3 frames without frame 4 while turbo packets in FLO do not capture any time diversity. Therefore, if receiver could know whether the punctured LTC is decodable before decoding, FLO-EV could provide significant power saving using an early exit methodology.

However, the physical layer coding structure of FLO-EV is completely different from that of FLO. The relatively simple early exit methodology for FLO cannot be used in FLO-EV because each turbo codeword can no longer be decoded on the fly as in FLO. Therefore, the CRC information is not reliable without TD.

Therefore, it would be desirable to have a way to reduce receiver processing in a FLO-EV system.

SUMMARY

Embodiments of the invention include a method for exiting receiver processing in a FLO-EV receiver, comprising receiving a communication signal comprising at least one received symbol, deriving a channel performance metric based on the received symbol, determining whether the metric exceeds a threshold, and when the metric exceeds the threshold, providing a logic signal to signal receiver processing cessation.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The system and method for reducing power consumption in a FLO-EV receiver will be described in the context of a portion of a receiver of a portable communication device. However, the system and method for reducing power consumption in a FLO-EV receiver can be used in any FLO-EV receiver device. Further, while embodiments of the system and method for reducing power consumption in a FLO-EV receiver will be described herein as using a metric that is developed using mutual information (MI) generated using a received symbol, any of a number of receive channel reliability measurements can be used to develop a metric that can be used as a receive channel reliability indicator that can in turn be used to indicate sufficient channel performance to enable receiver processing cessation. For example, instead of using the mutual information (MI) reliability metric, the system and method for reducing power consumption in a FLO-EV receiver can use other reliability metrics, such as, but not limited to, averaged signal-to-noise ratio (SNR), mean square error (MSE) or any other metric.

The system and method for reducing power consumption in a FLO-EV receiver can be implemented in hardware, software, or a combination of hardware and software. When implemented in hardware, the system and method for reducing power consumption in a FLO-EV receiver can be implemented using specialized hardware elements and logic. When portions of the system and method for reducing power consumption in a FLO-EV receiver is implemented in software, the software can be used to control the various components in a received of a portable communication device. The software can be stored in a memory and executed by a suitable instruction execution system (microprocessor). The hardware portion of the system and method for reducing power consumption in a FLO-EV receiver can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for reducing power consumption in a FLO-EV receiver comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 1:
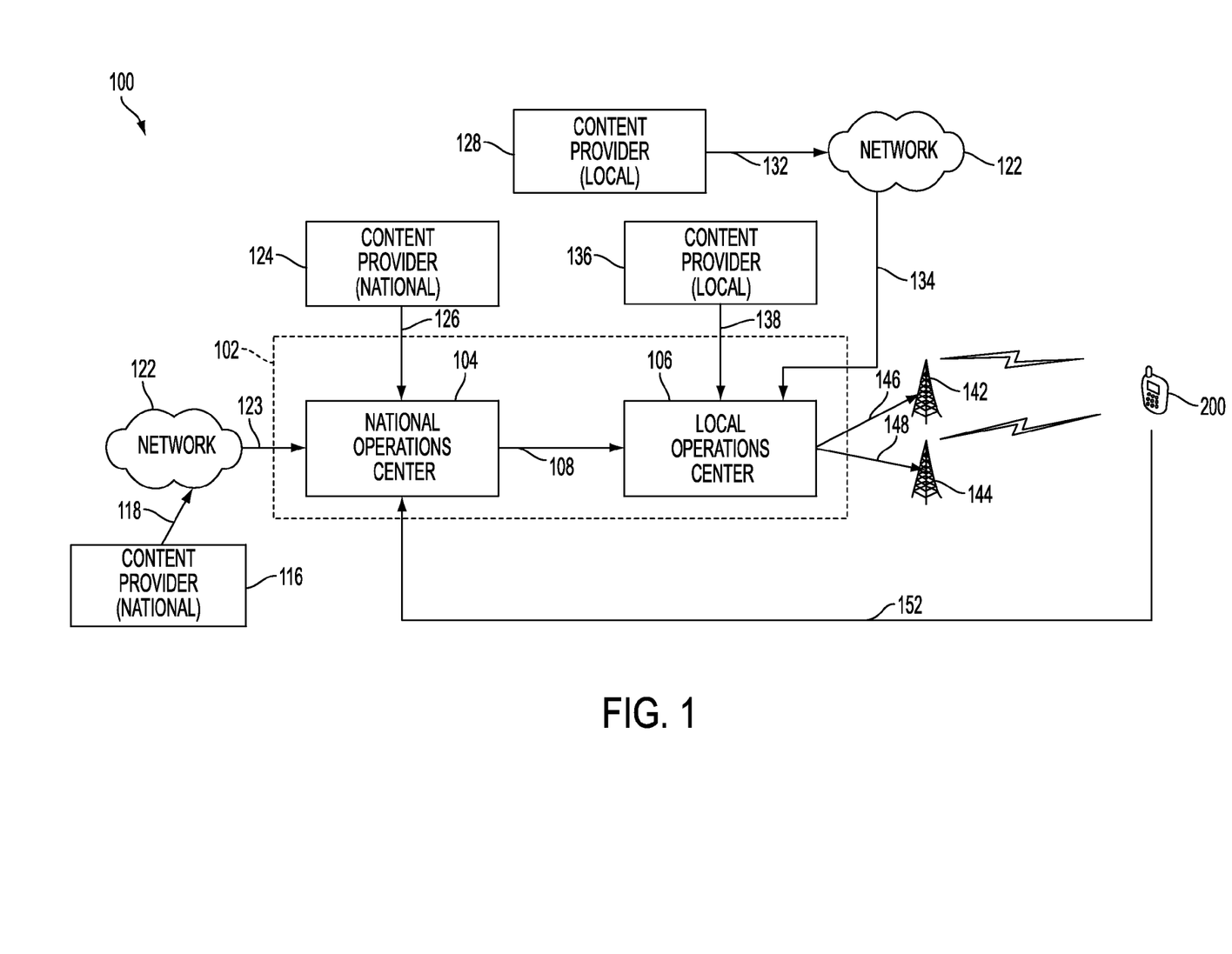
FIG. 1 is a block diagram illustrating the basic elements of a forward link only (FLO) network.

FIG. 1 is a block diagram illustrating the basic elements of a forward link only (FLO) network. The flow network 100 comprises a network operations center 102 one or more flow transmitters 142, 144, a reverse link 152 and one or more portable communication devices 200. In an embodiment, the network operations center 102 comprises a national operations center 104 and a local operations center 106. The national operations center 104 provides a national multiplex distribution stream over connection 108 to the local operations center 106. The connection 108 can be any high capacity communications channel.

The network operations center 102 receives content from a number of different sources over a number of different paths. Content may include, but is not limited to, data, audio, video, television programming, or other content. For example, the national operations center 104 can receive national content from a content provider 124 directly over a connection 126. The connection 126 can be a direct physical connection, a wireless connection or any other connection over which content can be provided to the national operations center 104. Alternatively, the national operations center 104 can receive national content from a content provider 116 over a network 122. The network 122 can be any of a wide area, a local area, or any other communications network over which content can be received over connection 118 from the content provider 116 and provided over connection 123 to the national operations center 104.

Similarly, the local operations center 106 can receive local content directly from a content provider 136 over connection 138. The connection 138 can be similar to the connection 126. Alternatively, the local operations center 106 can receive local content from a content provider 128 over the network 122 via connection 134. National content is content that can be provided to all portable communication devices 200, while local content is content that can be provided to a subset of all portable communication devices based on geographical location.

The network operations center provides the content to a wireless broadcast network embodied by transmitters 142 and 144. The transmitters 142 and 144 are intended to illustrate the entire infrastructure used to receive a terrestrial-based communication signal over connections 146 and 148, and to provide a wireless transmission to the portable communication device 200. While the details of the FLO network are known to those having ordinary skill in the art, it should be mentioned that the FLO network is a diversity-type network in which multiple transmitters (e.g., transmitters 142 and 144) are used to send multiple signals having identical content from a number of transmitters to each portable device 200. The portable communication device 200 comprises any mobile or portable communication device, such as, for example, a cell phone, a personal digital assistant (PDA), a wireless television receiver, or any other portable communication device. The portable communication device 200 includes a receiver configured to receive the FLO transmission from the transmitters 142 and 144.

The portable communication device 200 is also coupled to the national operations center 104 via a reverse link 152. In an embodiment, the reverse link 152 can be a 3G, or a 4G wireless communication channel provided by a cellular communication carrier or provider. The reverse link 152 allows the portable communication device 200 to submit registration and authentication information to the national operations center 104 so that the portable communication device 200 receives the appropriate content. However, it should be mentioned that the transmission of content from the network operations center, via the flow transmitters 142 and 144, to the portable communication device 200 are one way only.

Figure 2:
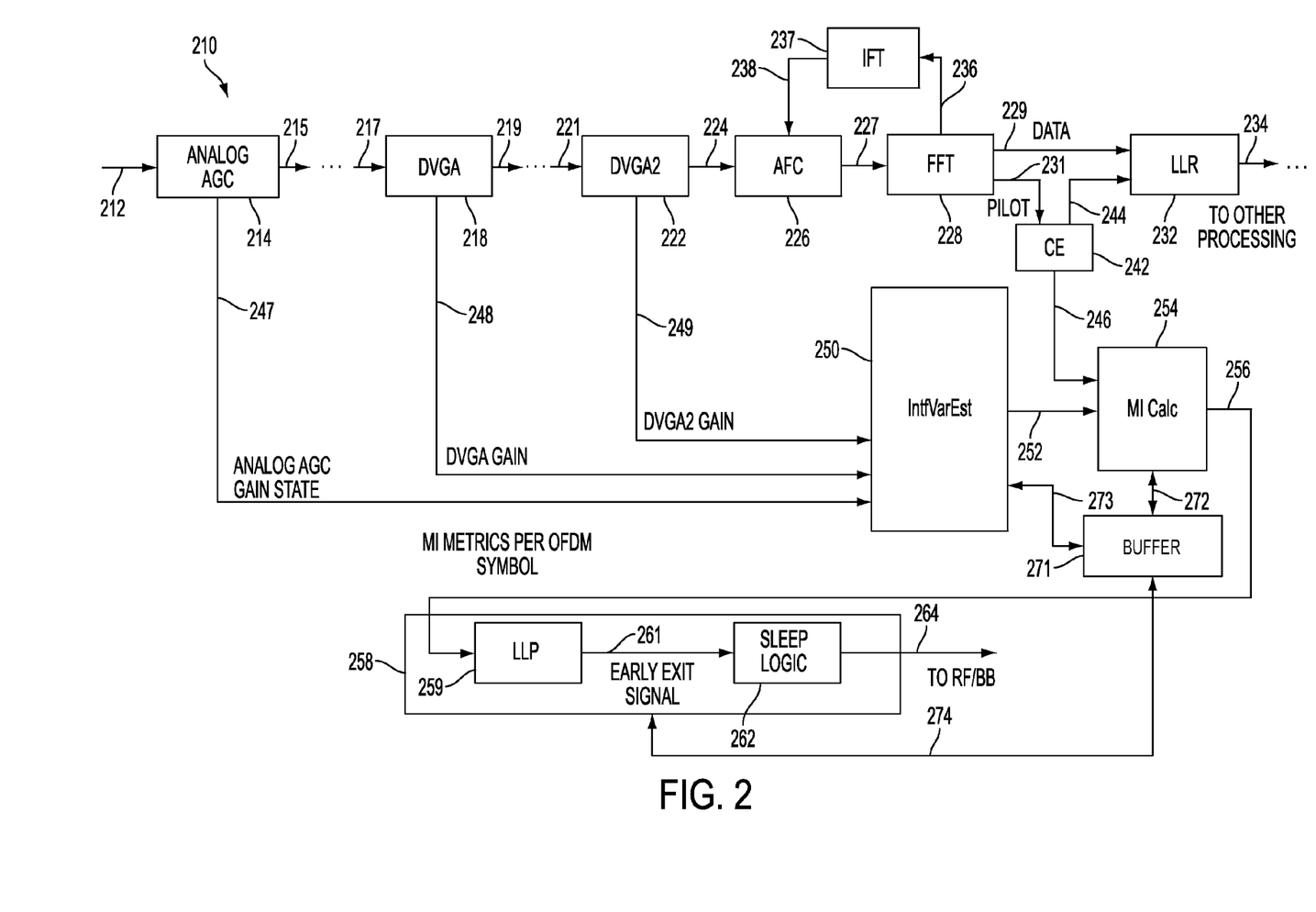
FIG. 2 is a block diagram illustrating a portion of a receiver of the portable communication device of FIG. 1

FIG. 2 is a block diagram illustrating a portion of a receiver of the portable communication device 200 of FIG. 1. The receiver portion 210 shown in FIG. 2 illustrates the relevant portions of the receiver within the portable communication device 200 that are germane to the discussion of the system and method for reducing power consumption in a FLO-EV receiver. In accordance with an embodiment of the system and method for reducing power consumption in a FLO-EV receiver, at least some of the elements in the receiver portion 210 provide information relating to the quality of the received signal so as to facilitate the development of an indicator, or indicator signal, that can be used to determine whether to cease receiver processing before all frames of a superframe are decoded. Suspending at least a portion of receiver processing prior to decoding all frames within a superframe allows the portable communication device 200 to consume less power than if all frames of a superframe are decoded.

The receiver portion 210 comprises an analog automatic gain control (AGC) element 214, a digital variable gain amplifier (DVGA) 218, a second DVGA (DVGA2), 222, an automatic frequency control (AFC) element 226, a fast Fourier transform (FFT) element 228, an initial fine timing (IFT) element 237, a channel estimate (CE) element 242 and a log likelihood ratio (LLR) generator 232. The receiver portion 210 also includes an interference variance estimate element 250, a mutual information (MI) calculation element 254, and an early exit hardware element 258. The early exit hardware element 258 includes a low latency processor (LLP) 259 which provides an indicator signal over connection 261 to a sleep logic element 262. The indicator signal on connection 261 can be used to signal that it is appropriate to suspend at least a portion of the receiver processing prior to decoding all frames in a superframe. The output of the sleep logic element 262 on connection 264 is provided to other radio frequency and baseband processing elements when it is indicated to suspend receiver processing after fewer than all received frames are decoded.

A memory buffer 271 buffers MI information per data symbol and is shown as being coupled to the interference variance estimate element 250, the MI calculation element 254 and to the early exit hardware element 258 to indicate that the elements shown in FIG. 2 comprise a hardware processing component and a software element. At least portions of the operation of the interference variance estimate element 250, the MI calculation element 254 and the early exit hardware element 258 involve the use of lookup tables and other memory functions.

A radio frequency (RF) input signal from the receiver front end (not shown for simplicity) is provided over connection 212 to the analog AGC element 214. The RF signal on connection 212 is an analog signal that has undergone initial receiver processing, which may include one or more of switching, filtering, low noise amplification, downconversion, or other front end receiver processing to prepare the RF signal for decoding. The analog AGC element 214 provides gain to the analog RF signal and provides an output on connection 215. The analog RF signal on connection 215 may undergo one or more additional processing steps (not shown for simplicity) to convert the analog RF signal on connection 215 to a digital signal on connection 217 before being provided over connection 217 to the digital variable gain amplifier (DVGA) 218. The DVGA 218 amplifies the digital signal on connection 217 and provides an amplified signal on connection 219. Additional processing occurs on the signal on connection 219 before being provided on connection 221 to a second digital variable gain amplifier (DVGA2) 222.

The output of the DVGA2 222 on connection 224 is provided to an automatic frequency control (AFC) element 226. The AFC element 226 stabilizes the frequency of the signal on connection 224 and provides an output over connection 227 to the FFT element 228. The FFT element 228 provides an output over connection 236 to the IFT element 237, provides a data output over connection 229 and provides a pilot symbol output over connection 231. The IFT element 237 develops the initial fine timing and provides an output over connection 238 to the AFC element 226.

The data output of the FFT element 228 on connection 229 is provided to the LLR generator 232, which performs signal processing, and provides an output to a turbo decoding element (not shown) over connection 234. The pilot symbol signal provided on connection 231 is provided to a channel estimate (CE) element 242. The CE element 242 provides the pilot symbol over connection 244 to the LLR generator 232 and also provides an estimate of the channel energy for each symbol over connection 246 to the MI calculation element 254.

The analog AGC gain state from the analog AGC element 214 is provided over connection 247 to the interference variance estimate element 250. The DVGA gain value from the DVGA 218 is provided over connection 248 to the interference variance estimate element 250 and the DVGA2 gain value from the DVGA2 element 222 is provided over connection 249 to the interference variance estimate element 250. The interference variance estimate element 250 uses the gain state/values of the various elements within the receiver portion 210 to develop an output on 252. The output on connection 252 is a signal that estimates the interference contained in the current received symbol.

The estimate of the channel energy for each symbol provided by the CE element 242 over connection 246 and the interference estimate on connection 252 are provided to the MI calculation element 254. The MI calculation element 254 analyzes the information on connections 246 and 252 to develop mutual information (MI) metrics per OFDM symbol on connection 256. The information on connection 256 is provided to the early exit hardware elements 258 to allow the low latency processor 259 to determine whether or not to provide an early exit signal over connection 261 to the sleep logic 262.

Figure 3:
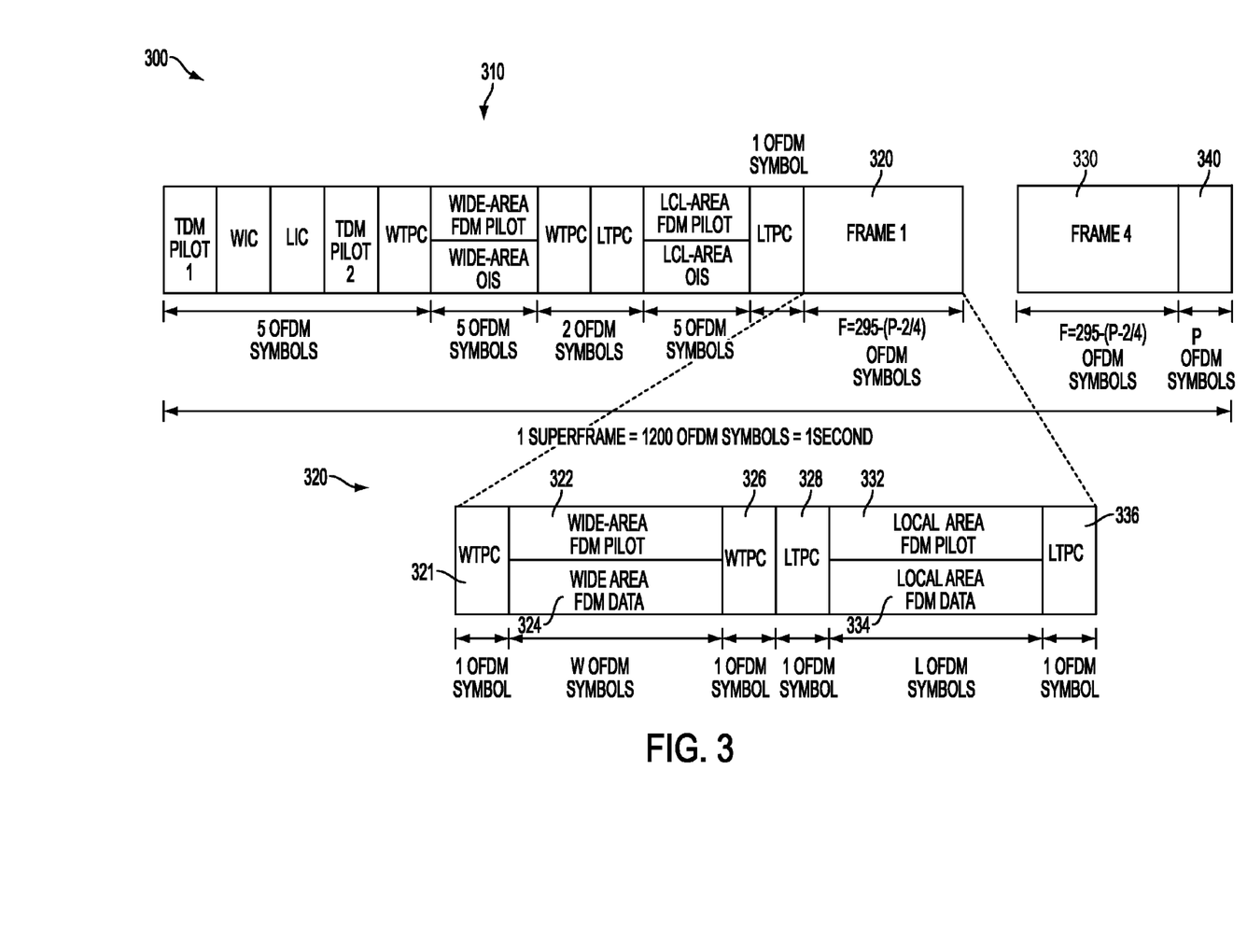
FIG. 3 is a block diagram illustrating an example of a FLO superframe.

FIG. 3 is a block diagram illustrating an example of a FLO superframe 300. The superframe 300 comprises a preamble portion 310 that comprises pilot and OIS (overhead information symbol) information, frames 320 and 330, and positional pilot channel/reserved symbols portion 340. Although four (4) frames are included in a superframe 300, only frames one (1) and four (4) are shown in FIG. 3 for simplicity of illustration.

The preamble 310 comprises 18 OFDM symbols in which TDM pilot channels occupy the first four symbols and a wide area transition pilot channel (WTPC) occupies the fifth symbol. The next five symbols are divided among wide area FDM pilot and wide area OIS information. The following two symbols comprise wide area transition pilot channel (WTPC) information and local area transition pilot channel (LTPC) information, while the following five symbols are divided between local area FDM pilot information and local area OIS information. The following symbol comprises a local area transition pilot channel (LTPC).

Frames one through four are similar in structure so only frame one, 320, will be described in detail. Frame one, 320, comprises a wide area transition pilot channel (WTPC) 321 occupying a first symbol, "W" symbols comprising wide area FDM pilot information 322 and wide area FDM data 324, a single OFDM symbol comprising WTPC information 326, a single OFDM symbol comprising LTPC information 328, "L" OFDM symbols comprising local area FDM pilot information 322 and local area FDM data 334, followed by a single OFDM symbol 336 comprising the LTPC.

Figure 4:
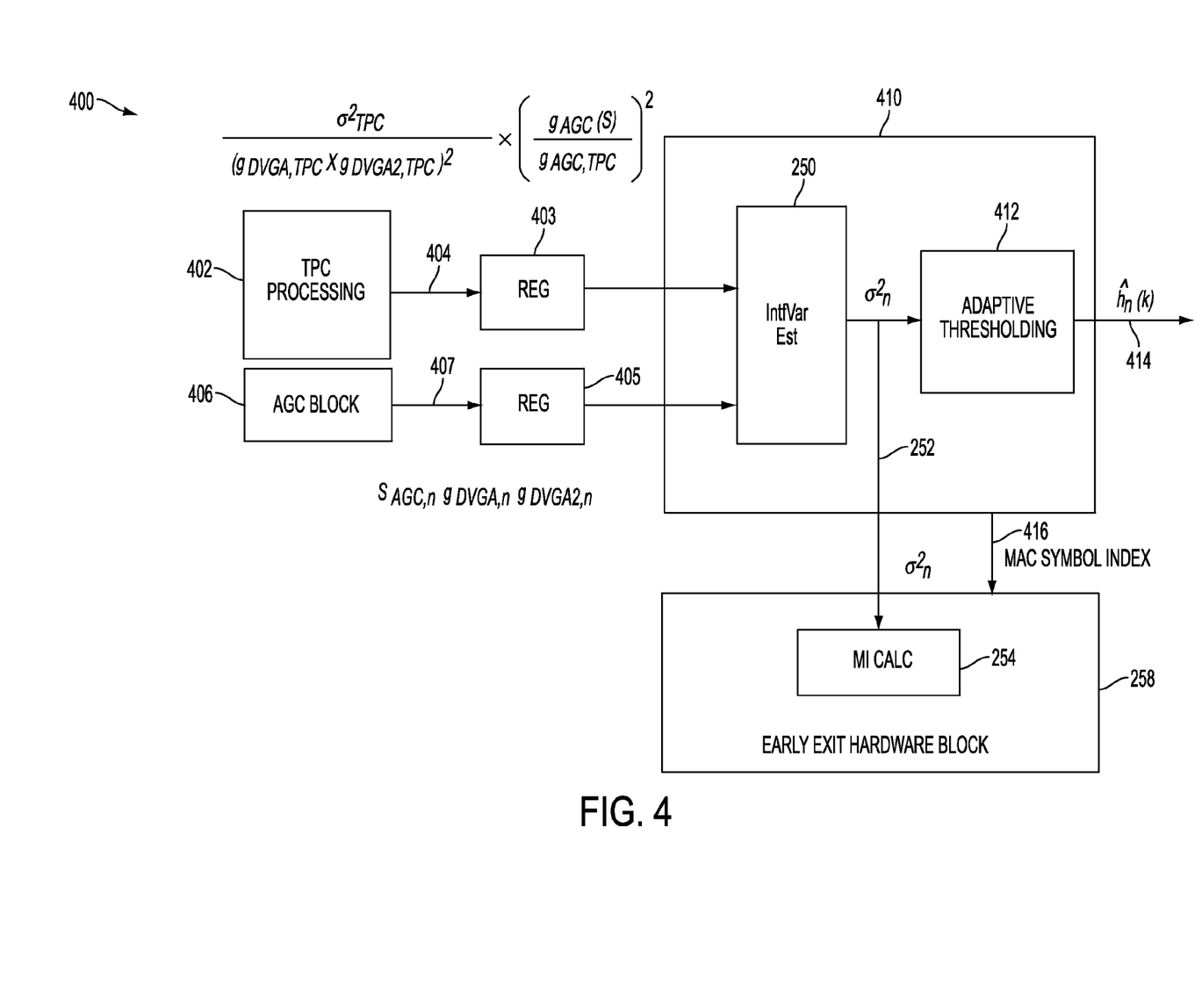
FIG. 4 is diagram illustrating an embodiment of the system and method for reducing power consumption in a FLO-ER receiver that uses transition pilot channel (TPC)-based interference estimation.

FIG. 4 is block diagram of the elements used in an embodiment of the system and method for reducing power consumption in a FLO-EV receiver that uses transition pilot channel (TPC)-based interference estimation.

A number of different methodologies can be used to perform interference variance estimation for each OFDM symbol. An interference variance estimate based on the transition pilot channel (TPC) along with AGC and DVGA scaling will be described below. Other methodologies, such as those that rely on channel estimation or other techniques, can also be used to develop the interference variance estimate.

The system 400 comprises a transition pilot channel (TPC) processing element 402, and AGC element 406, a processing element 410, referred to as an interference estimation and adaptive thresholding block, which includes the interference variance estimation element 250 (FIG. 2) and an adaptive thresholding element 412, and the early exit hardware element 258. In the embodiment shown in FIG. 4, the MI calculation element 254 (FIG. 2) is shown as residing within the early exit hardware element 258, but such location is not required.

The TPC-based interference variance estimation methodology normalizes the interference estimate using the AGC gain (i.e., the total AGC gain of the analog AGC 214, DVGA 218 and DVGA2 222 (FIG. 2)) applied to the symbol of interest with the gain applied to the TPC symbol. The operation of the analog AGC element 214 (FIG. 2), the DVGA element 218 (FIG. 2) and the DVGA2 element 222 (FIG. 2) is such that the sum power of the signal and the interference is mapped to a constant value in each OFDM symbol (given by the DVGA set point). With AGC in effect, for higher signal to interference ratios, the interference value is scaled by the AGC gain corresponding to the fading gain variation while the signal component remains substantially constant (after AGC). In particular, if K is the AGC set point, then the signal component is mapped to $$K * \frac{SNR}{1+SNR}$$

while the noise component is mapped to $$K * \frac{1}{1+SNR}.$$

For SNR variations (due to fading), at high average SNR values, the variation in noise power will be much more significant than the variation in the signal power. Therefore, the thresholding operation (which is based on interference energy estimate) performed by the adaptive thresholding element 412 is expected to be more successful if the threshold accounts for the AGC gain variation. Hence, the threshold for OFDM symbol n in the TPC-based embodiment is given by:

$$\text{Threshold}_{TPC}(n) = 12 \times \frac{AgcGain^2(n)}{AgcGain^2(TPC)} \times \text{interference}_{TPC}$$

where AgcGain(n) corresponds to the linear AGC gain applied to the samples of the OFDM symbol n while AgcGain(TPC) corresponds to the linear AGC gain applied to the samples of the TPC symbol.

In this embodiment, a TPC-based interference estimation is used by both the adaptive thresholding element 421 and by the early exit hardware element 258; therefore, the interference variance estimate element 250 can be used for both operations.

The interference variance estimate element 250 retrieves a scaled TPC from the LLP 259 (FIG. 2) and multiplies the scaled TPC by an appropriate AGC gain value to obtain an interference estimate for the current symbol. The operation of the interference variance estimate element 250 will be described in greater detail below. The interference estimate is passed to the adaptive thresholding element 412 and to the MI calculation element 254, as described above.

In the TPC processing element 402, an interference variance of the TPC symbol, $\sigma^2_{TPC}$ will be computed. The value $\sigma^2_{TPC}$ is updated at least once every frame. When a local channel is present, both $\sigma^2_{WTPC}$ and $\sigma^2_{LTPC}$ will be updated by processing the WTPC and LTPC symbols respectively. In the default mode, an interference estimate of wide (local) data symbols will be derived from the corresponding $\sigma^2_{WTPC}$* ($\sigma^2_{LTPC}$).

When an interference estimate for early exit is obtained from the TPC processing element 402, AGC gain compensation is applied. The TPC interference variance $\sigma^2_{TPC}$ and interference variance of the current symbol $\sigma^2_n$ have the following relationship:

$$\sigma^2_n = \sigma^2_{TPC} \times \left(\frac{g_{AGC,n}}{g_{AGC,TPC}}\right)^2 \times \left(\frac{g_{DVGA,n}}{g_{DVGA,TPC}}\right)^2 \times \left(\frac{g_{DVGA2,n}}{g_{DVGA2,TPC}}\right)^2$$

To derive $\sigma^2_n$ from $\sigma^2_{TPC}$, a series of squares and multiplications are performed and could result in a large dynamic range. To facilitate a hardware implementation, the following methodology is proposed. First, re-arrange the right hand side (RHS) of the above equation, resulting in:

$$\sigma^2_n = \frac{\sigma^2_{TPC}}{(g_{DVGA,TPC} \times g_{DVGA2,TPC})^2} \times \left(\frac{g_{AGC,n}}{g_{AGC,TPC}}\right)^2 \times (g_{DVGA,n} \times g_{DVGA2,n})^2$$

The first term on the RHS is the TPC interference estimate divided by respective squared DVGA and DVGA2 gains, which can be computed in the LLP 259 (FIG. 2) since all parameters are available in the LLP 259. The second term is the squared ratio of the current analog AGC gain value (connection 247, FIG. 2) over the TPC analog gain value. Though $g_{AGC,n}$ is unknown when the TPC symbol is processed, there are a finite number of possible analog gain values. Since AGC gain steps between adjacent gain states can be passed from gain step size HW registers (not shown) to the LLP 259 during TPC processing, the squared gain ratios of all gain states with respect to the TPC gain state can be computed in the LLP 259, tabulated and written back to the registers (not shown) in the interference variance estimation element 250 (FIG. 2). It can be further seen that only the product of the first term and second term is written to the registers in the interference variance estimation element 250 (FIG. 2). Therefore, the LLP 259 will write the following scaled TPC interference estimate values to the interference variance estimation element 250 (FIG. 2).

$$\frac{\sigma_{TPC}^2}{(g_{DVGA,TPC} \times g_{DVGA2,TPC})^2} \times \left(\frac{g_{AGC}(s)}{g_{AGC,TPC}}\right)^2,$$

where $s = 0, 1, , 6$ is analog gain state

In FIG. 4, the interference variance estimate element 250 interfaces with the TPC processing element 402 via a set of hardware registers 403 containing scaled TPC interference variance estimate values. The registers 403 are updated as each TPC symbol is processed. The interference variance estimate element 250 also receives AGC gain values applied to the current symbol as inputs on connection 407.

Figure 5:
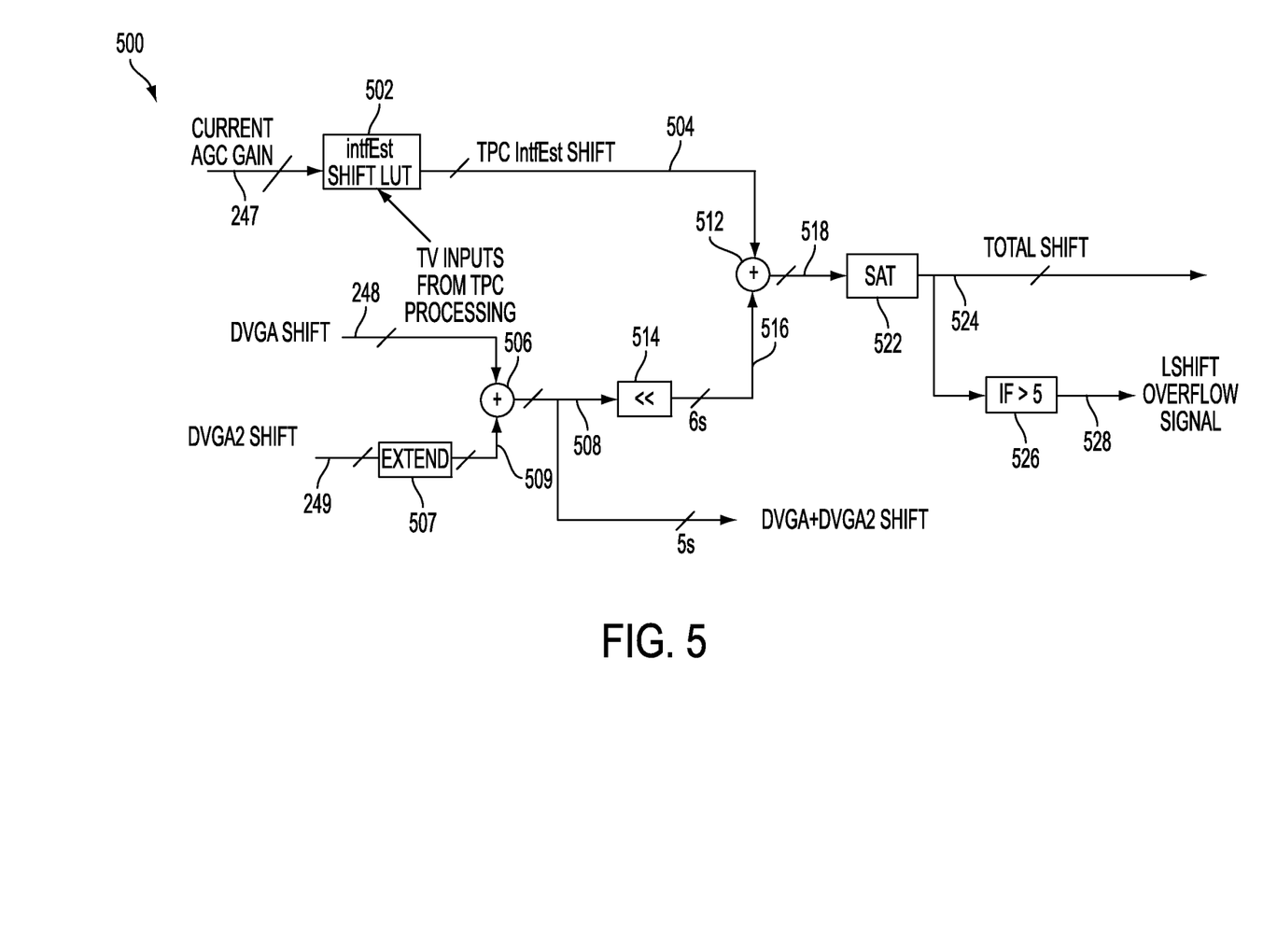
FIG. 5 is a schematic diagram illustrating a portion of the interference variance estimate element of FIG. 4.

FIG. 5 is a schematic diagram illustrating a portion of the interference variance estimate element 250 of FIG. 4. The logic circuit 500 applies a bit shift to the TPC values and to the gain values described above. The current AGC gain is provided over connection 247, the DVGA gain is provided over connection 248 and the DVGA2 gain is provided over connection 249. The current AGC gain on connection 247 is provided to an interference estimate shift lookup table 502, which provides an output on connection 504 representing the shift of the TPC interference estimate. The signal on connection 504 is provided to an adder 512.

The DVGA gain signal on connection 248 is provided to an adder 506. The DVGA2 gain signal is provided to an element 507 that extends the bit length of the signal on connection 249. The signal on connection 509 is provided to the adder 506. The output of the adder 506 is provided over connection 508 as the output DVGA+DVGA2 shift, and is provided to element 514. The element 514 provides a 1 bit left shift to the signal on connection 508. The output of element 514 is provided to the adder 512.

The adder 512 combines the signals on connections 504 and 516 to produce a signal on connection 518, which is provided to a saturation element 522. The output of the saturation element on connection 524 represents the total shift of the current AGC gain, the DVGA gain and the DVGA2 gain. If the signal on connection 524 exceeds 5 bits, then the element 526 develops a left shift overflow signal on connection 528.

All scaled TPC interference variance estimate values are represented in terms of a fixed point number and a bit shift. The scaled TPC interference variance estimate can be decomposed as follows:

scaled TPC IntfVarEst=TPC IntfEst Mult×2$^{TPCIntfEst\_Shift}$

The pair (TPC IntfEst Mult, TPC IntfEst Shift) is used to represent the scaled TPC interference variance estimate in the interface 403. The main advantage of such a representation is that it can represent values of large dynamic range with a small number of bits. Similarly, the DVGA gain can also be decomposed to two parts as follows:

DVGA Gain=DVGA Mult Gain×2$^{DVGAShift}$

Therefore, computation of the interference estimate can be simplified to multiplication of all the multiplied gains followed by the total shift as follows:

$\sigma_n^2$=(TPC Intf Est Mult×(DVGA Mult Gain×DVGA2 Mult Gain)$^2$)×2$^{(TPC\ IntfEst\ Shift+2(DVGA\ Shift+DVGA2Shift))}$ The total bit shift can be computed using the logic shown in FIG. 5. The TPC interference estimate shift value on connection 504 can be read from TPC Intf Est Shift registers 403 using the analog AGC gain state of the current symbol. A 1-bit Lshift (left shift) is applied to DVGA+DVGA2 shift by the shift element 514 since DVGA and DVGA2 gains are squared. Considering the dynamic range of interference, the total shift is saturated to 5 bits. If the total left shift is more than 5 bits, an Lshift overflow signal will become high on connection 528 for logging and debugging purposes.

Figure 6:
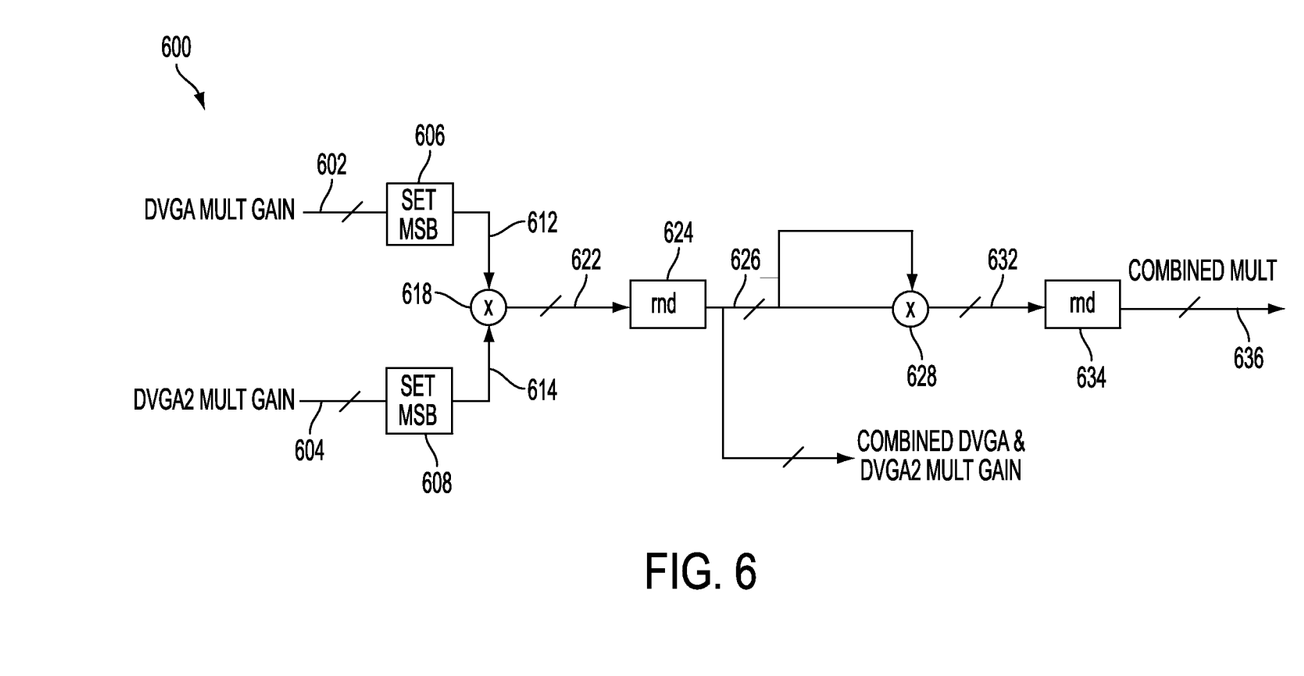
FIG. 6 is a schematic diagram illustrating a portion of the interference variance estimate element 250 of FIG. 4.

FIG. 6 is a schematic diagram illustrating a portion of the interference variance estimate element 250 of FIG. 4. Values representing the squared DVGA plus DVGA2 multiplied gain can be computed using the logic 600 before applying them to the scaled TPC interference variance estimate. The DVGA and DVGA2 multiplied gain values are signals on connections 602 and 604, respectively. The signal on connection 602 has a most significant bit set using element 606 and the signal on connection 604 has a most significant bit set using the element 608. The signals on connections 612 and 614 are combined in the element 618 to form a signal on connection 622. The signal on connection 622 is then rounded by the element 624 and supplied to a multiplier 628. The multiplier 628 generates a signal on connection 632, which is rounded in the element 634 on connection 636. Rounding the final multiplied gain value ensures that the overall quantization error in the interference variance estimate element 250 is less than a couple tenths of a dB.

Figure 7:
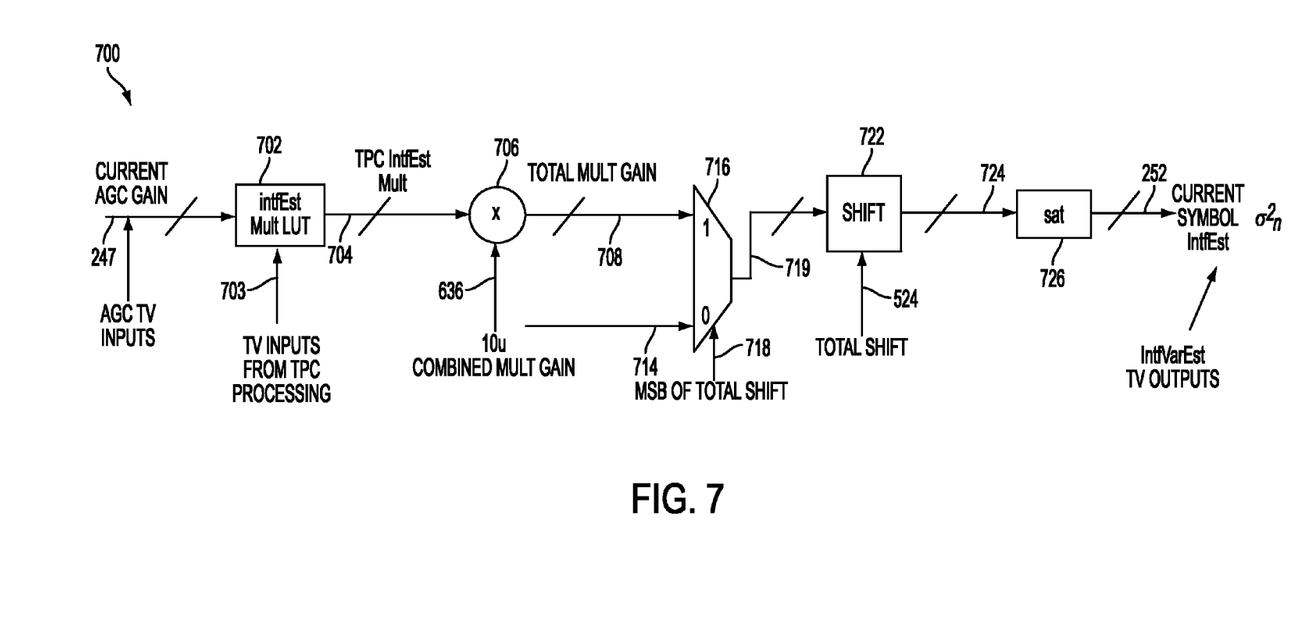
FIG. 7 is a schematic diagram illustrating a portion of the interference variance estimate element of FIG. 4 that provides the final interference variance estimate.

FIG. 7 is a schematic diagram illustrating a portion of the interference variance estimate element 250 of FIG. 4 that provides the final interference variance estimate.

The multiplied TPC interference estimate signal, TPC intfEst mult, is retrieved from the TPC Intf Est Mutt registers 403 using the analog AGC gain of the current symbol on connection 247 as an index to the lookup table 702. The value of TPC intfEst mult on connection 704 is scaled in the scaler 706 by the total multiplied gain on connection 636 as computed by the logic of FIG. 6. The value on connection 708 is provided to a multiplexer 716. The signal on connection 714 is all 1s. The most significant bit of the total shift value on connection 524 (FIG. 5) controls the output of the multiplexer 716 on connection 719. The signal on connection 719 is provided to a shift element 722, which receives the total shift value on connection 524 (FIG. 5). The output of the shift element 722 on connection 724 is an unsigned value on connection 724. The signal on connection 724 is provided to a saturation element 726, which provides the current symbol interference variance estimate on connection 252.

Figure 8:
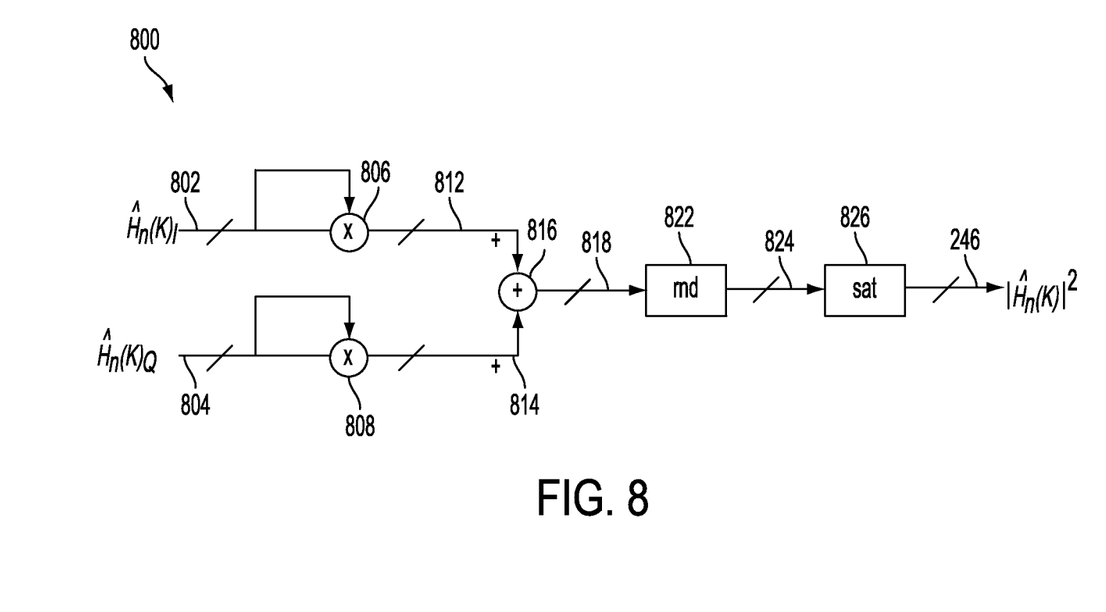
FIG. 8 is a schematic diagram illustrating an embodiment of the channel estimate element of FIG. 2 and the computation of the channel energy per subcarrier.

FIG. 8 is a schematic diagram illustrating an embodiment of the channel estimate element 242 of FIG. 2 and the computation of the channel energy per subcarrier. The logic 800 comprises multipliers 806 and 808, which receive signed in-phase (I) and quadrature (Q) channel parameter input values on connections 802 and 804, respectively. The multiplier 806 provides an unsigned signal on connection 812 and the multiplier 808 provides an unsigned signal on connection 814. The respective signals on connections 812 and 814 are provided to an adder 816. The adder 816 provides an unsigned signal representing the I and Q channel parameter input values on connection 818. The unsigned signal representing the I and Q channel parameter input values on connection 818 are rounded by element 822 and provided over connection 824 to a saturation element 826. The saturation element 826 provides an unsigned 12 bit signal representing the channel energy for each subcarrier over connection 246.

Figure 9:
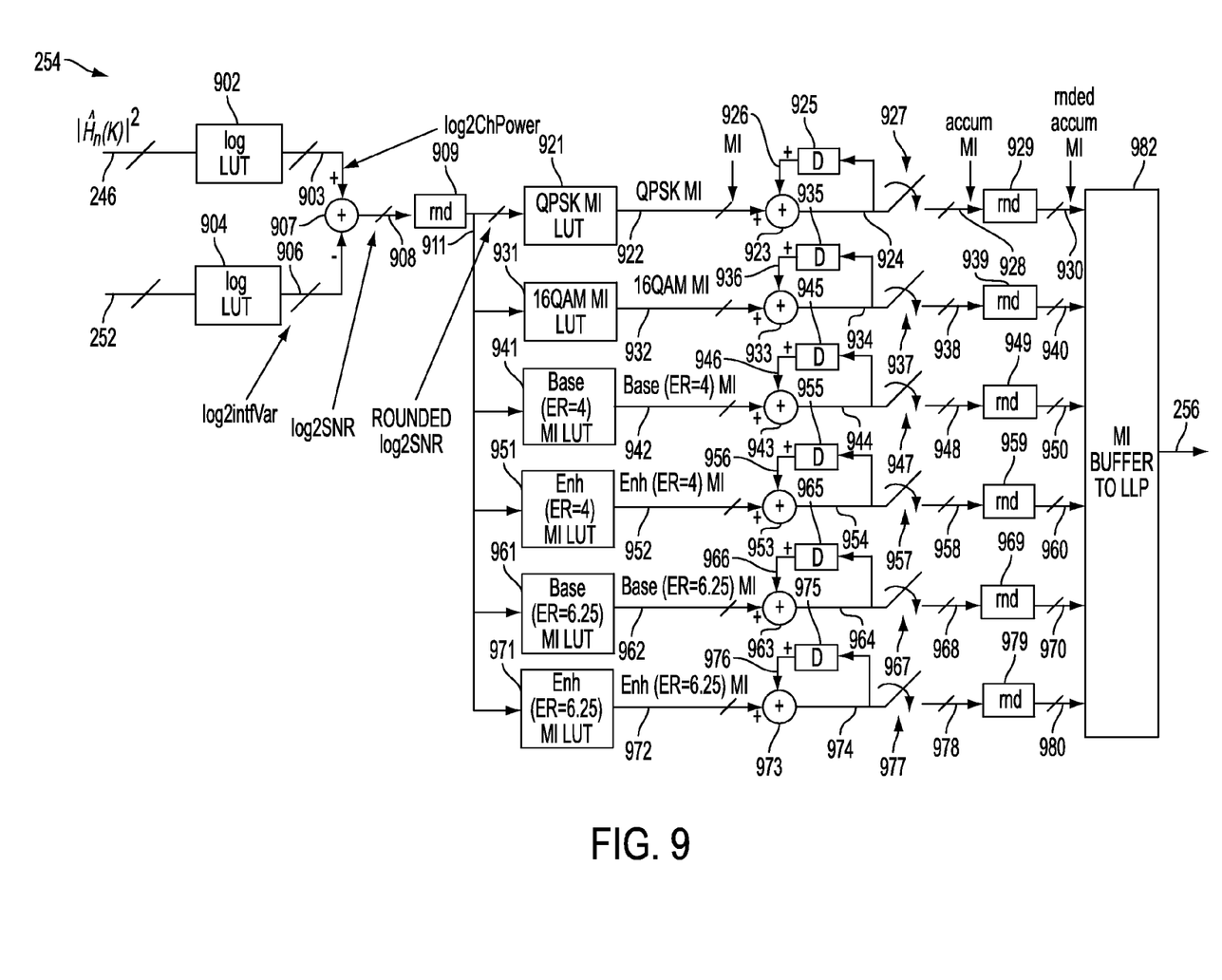
FIG. 9 is a schematic diagram illustrating the MI calculation element of FIG. 2.

FIG. 9 is a schematic diagram illustrating the MI calculation element 254 of FIG. 2. The implementation of the MI calculation element 254 comprises a log lookup table 902 configured to receive the channel energy for each subcarrier over connection 246 and a lookup table 904 configured to receive the interference variance estimate over connection 252. The lookup table 902 maps the channel energy for each subcarrier on connection 246 to the log 2 domain. Similarly, the lookup table 904 maps the interference variance estimate on connection 252 to the log 2 domain. The channel energy and the interference variance estimate are mapped to the log domain to simplify the computation of the signal to noise ratio (SNR).

The output of the lookup table 902 is provided to an adder 907 over connection 903 and the output of the lookup table 904 is provided to the adder 907 over connection 906. The log 2 domain interference variance estimate on connection 906 is subtracted from the log 2 domain channel energy by the adder 907 to obtain the instantaneous SNR (in the log 2 domain) of each subcarrier on connection 908.

The signal on connection 908 is provided to a rounding element 909 that converts the signed signal on connection 908 to a signed signal having fewer bits on connection 911. The signal on connection 911, representing the log 2 SNR of each subcarrier, is provided to a number of lookup tables to account for all possible modulation modes.

In FLO-EV, there are four possible modulation modes, i.e., QPSK, 16QAM, layered mode with energy ratio (ER)=4 and layered mode with ER=6.25. In layered modes, both base layer and enhancement (Enh) layer accumulated MI are computed. The base layer accumulated MI does not impact early exit decision making. It is mainly used for logging purpose. In an embodiment, six MI lookup tables, 921, 931, 941, 951, 961 and 971 are used to map the instantaneous SNR in the logs domain to an instantaneous MI value.

The MI value output of the lookup table 921 is provided over connection 922 to an adder 923. The output of the adder 923 is provided over connection 924 to a switch 927 and to a register 925. The switch 927 switches once per symbol. The output of the register 925 is provided over connection 926 to the adder 923. The output of the switch 927 on connection 928 is an unsigned signal that is rounded by element 929 to an unsigned signal on connection 930, where it is provided to MI buffer 982.

The MI value output of the lookup table 931 is provided over connection 932 to an adder 933. The output of the adder 933 is provided over connection 934 to a switch 937 and to a register 935. The switch 937 switches once per symbol. The output of the register 935 is provided over connection 936 to the adder 933. The output of the switch 937 on connection 938 is an unsigned signal that is rounded by element 939 to an unsigned signal on connection 940, where it is provided to MI buffer 982.

The MI value output of the lookup table 941 is provided over connection 942 to an adder 943. The output of the adder 943 is provided over connection 944 to a switch 947 and to a register 945. The switch 947 switches once per symbol. The output of the register 945 is provided over connection 946 to the adder 943. The output of the switch 947 on connection 948 is an unsigned signal that is rounded by element 949 to an unsigned signal on connection 950, where it is provided to MI buffer 982.

The MI value output of the lookup table 951 is provided over connection 952 to an adder 953. The output of the adder 953 is provided over connection 954 to a switch 957 and to a register 955. The switch 957 switches once per symbol. The output of the register 955 is provided over connection 956 to the adder 953. The output of the switch 957 on connection 958 is an unsigned signal that is rounded by element 959 to an unsigned signal on connection 960, where it is provided to MI buffer 982.

The MI value output of the lookup table 961 is provided over connection 962 to an adder 963. The output of the adder 963 is provided over connection 964 to a switch 967 and to a register 965. The switch 967 switches once per symbol. The output of the register 965 is provided over connection 966 to the adder 963. The output of the switch 967 on connection 968 is an unsigned signal that is rounded by element 969 to an unsigned signal on connection 970, where it is provided to MI buffer 982.

The MI value output of the lookup table 971 is provided over connection 972 to an adder 973. The output of the adder 973 is provided over connection 974 to a switch 977 and to a register 975. The switch 977 switches once per symbol. The output of the register 975 is provided over connection 976 to the adder 973. The output of the switch 977 on connection 978 is an unsigned signal that is rounded by element 979 to an unsigned signal on connection 980, where it is provided to MI buffer 982.

The six accumulated MI metrics along with a MAC symbol index are written to the MI buffer 982 for each active MAC symbol. The MI buffer 982 corresponds to the buffer 271 in FIG. 2. The AGC gain state (connection 247, FIG. 2) and the combined DVGA and DVGA2 gain in log domain (connection 636, FIG. 6) are also written to the MI buffer 982. The output of the MI buffer 982 is provided to the LLP 259 (FIG. 2) at the end of each frame for further early exit processing in the LLP 259, as described above.

Figure 10:
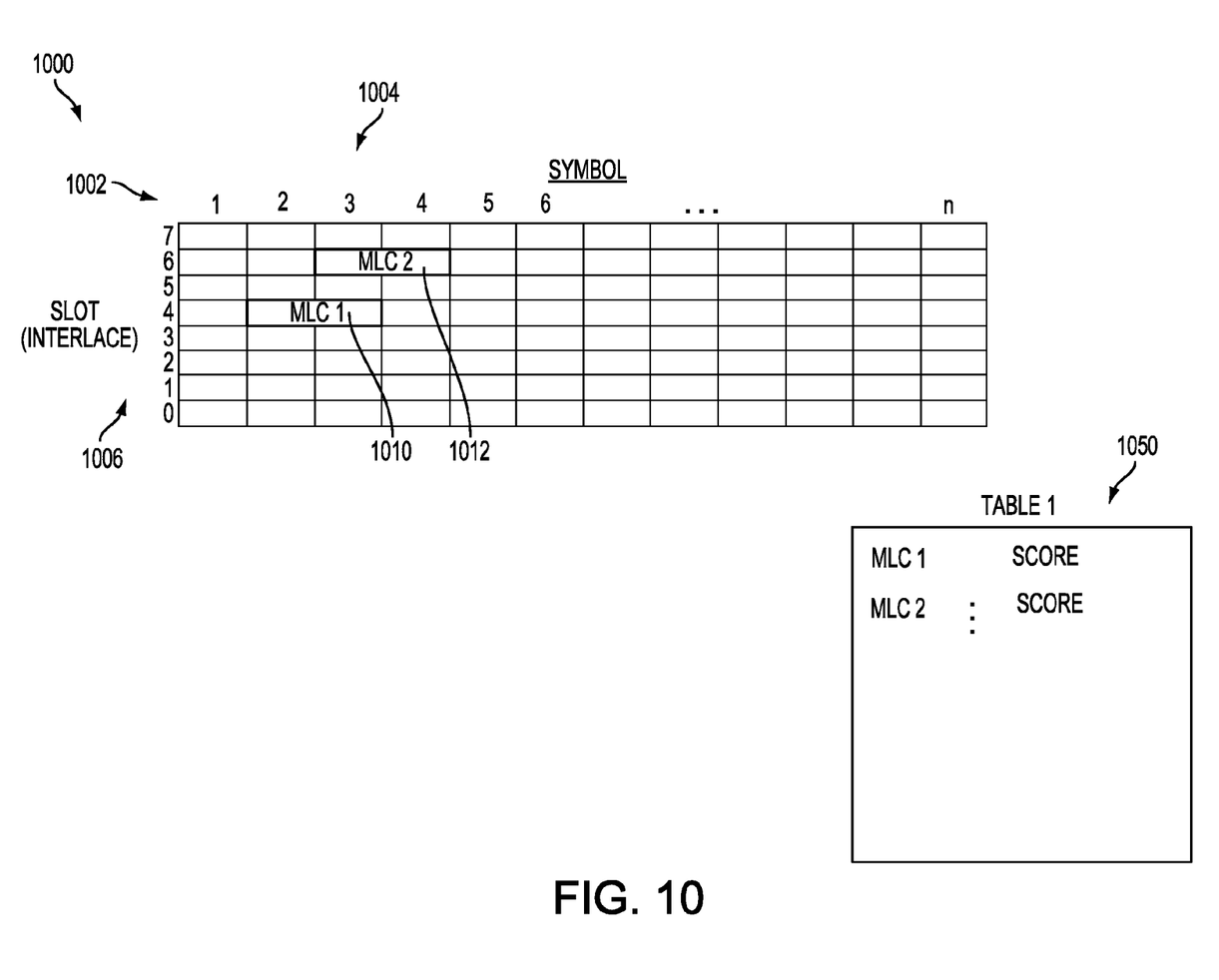
FIG. 10 is a graphical illustration showing a frame portion containing example multicast logical channels.

FIG. 10 is a graphical illustration 1000 showing a frame portion 1002 containing example multicast logical channels. The frame portion 1002 comprises a number ("W" or "L" of FIG. 3, depending on whether the subject frame contains wide area or a local area data) of symbols that can occur, for example, within the data portion 324 or 334 of the frame 320 of FIG. 3. The frame portion 1002 contains a number of symbols 1004, which are each further subdivided into a number of slots, or interlaces 1006. For example, each OFDM symbol 1004 comprises eight interlaces 1006. For example purposes only, a first multicast logical channel (MLC) 1010 is shown as spanning symbols 2 and 3 and occurs within interlace 4. A second exemplary MLC 1020 is shown as spanning symbols 3 and 4, and occurs within interlace number 6. In accordance with an embodiment of the system and method for reducing power consumption in a FLO-EV receiver, each MLC is scored and tested against a threshold to determine whether the subject MLC can be decoded without decoding all frames (e.g., frames 1 through 4,) of a superframe.

The graphical illustration 1000 also includes a table 1050, in which each MLC is scored to determine whether or not the threshold is exceeded to signal early exit as described above. In an embodiment, the threshold is stored in the LLP 259 (FIG. 2), which is where the early exit computation occurs. The MLC score is derived from the MI values in buffer 982 and according to MLC scheduling information.

Figure 11:
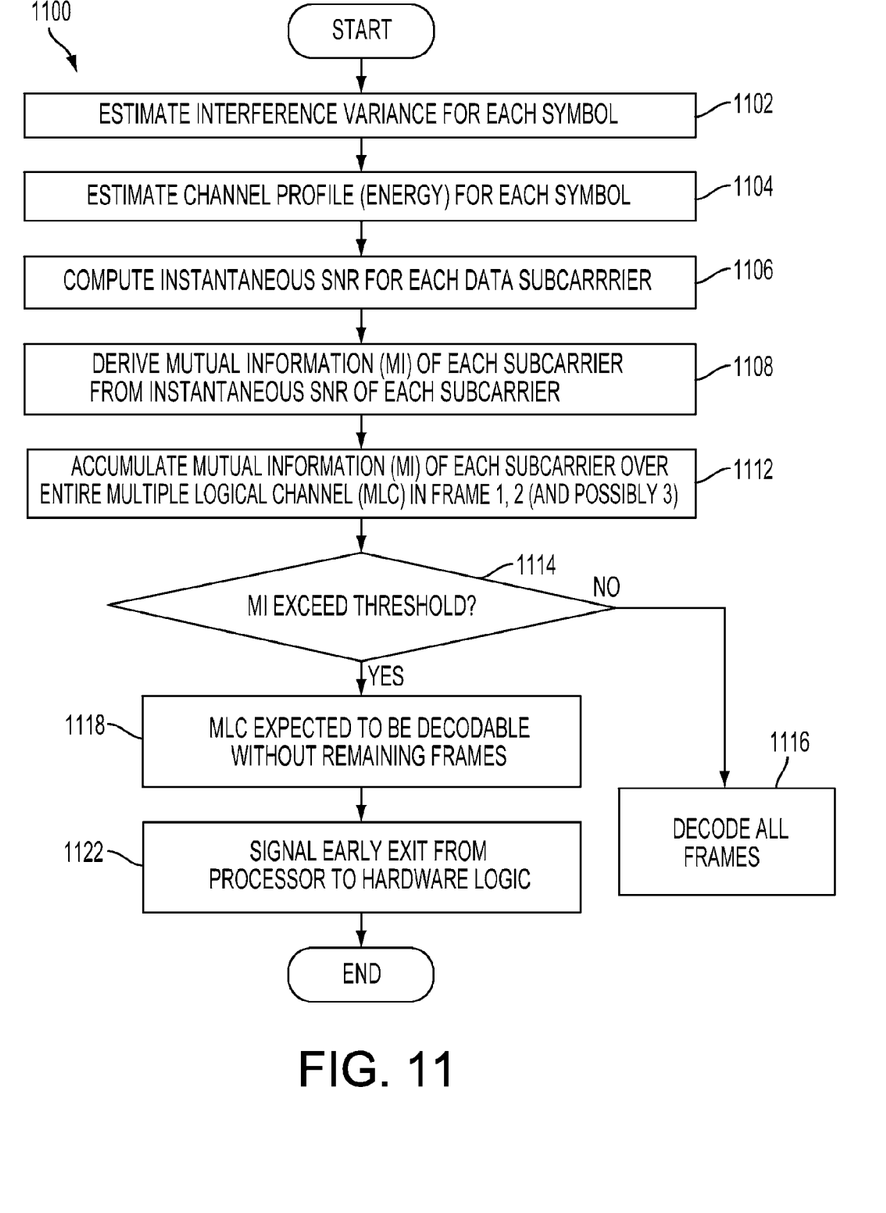
FIG. 11 is a flow chart illustrating the operation of an embodiment of the method for reducing power consumption in a FLO-EV receiver.

FIG. 11 is a flow chart 1100 illustrating the operation of an embodiment of the method for reducing power consumption in a FLO-EV receiver. The blocks in the flowchart can be performed in or out of the order shown, and in certain embodiments, can be performed in parallel.

In block 1102 the interference variance estimate element 250 estimates the interference variance for each OFDM symbol, as described above. In block 1104, the channel estimate element 242 estimates the channel profile, or energy, for each subcarrier in each OFDM symbol. In block 1106, MI calculation element 254 computes the instantaneous signal to noise ratio (SNR) for each data subcarrier. In block 1108, the MI calculation element 254 derives the mutual information of each subcarrier using the instantaneous SNR of each subcarrier. In block 1112, the MI calculation element 254 accumulates the mutual information of each subcarrier over an entire MLC occurring in frames 1, 2, and possibly frame 3 of a superframe.

In block 1114 it is determined whether the mutual information exceeds a threshold. If it is determined in block 1114 that the accumulated mutual information does not exceed the threshold, then, in block 1116, the receiver portion 210 decodes all received frames of the superframe.

If however, in block 1114 is determined that the mutual information exceeds the threshold, then, in block 1118 the multicast logical channel is expected to be decodable without decoding the remaining frames (for example, frame 4 and possibly frame 3 of a superframe, as shown in FIG. 3).

In block 1122, the LLP 259 (FIG. 2) signals early exit to the sleep logic element of 262, so that portions of the receiver and baseband sections (not shown for simplicity) can be deactivated, thereby reducing power consumption.

While various embodiments of the invention have been described, it will be apparent to those of ordinary skill in the art that many more embodiments and implementations are possible that are within the scope of the invention. The system and method for providing additional content to a program stream is not limited to a specific type of additional content or to a specific type of content delivery.

What is claimed is:

1. A system for reducing power consumption in an Enhanced Forward Link Only (FLO-EV) receiver, comprising:
   a receiver configured to receive a communication signal comprising at least one received symbol;
   at least one channel performance indicator corresponding to the received symbol;
   a channel parameter estimate element configured to provide a channel energy profile for the received symbol;
   an interference variance element configured to receive the at least one channel performance indicator and provide an interference variance estimate for the received symbol;
   a mutual information calculation element configured to receive the interference variance estimate and the channel estimate, the mutual information calculation element configured to develop a metric for the received symbol; and
   a processor element configured to receive the metric and provide a logic signal to signal receiver processing cessation when the metric exceeds a threshold.

2. The system of claim 1, wherein the interference variance estimate element further comprises:
   logic configured to normalize the interference variance estimate using the at least one channel performance indicator.

3. The system of claim 1, wherein the channel parameter estimate element further comprises:
   logic to determine a channel energy profile per subcarrier of the received symbol.

4. The system of claim 1, wherein the mutual information calculation element further comprises logic configured to:
   determine an instantaneous signal-to-noise ratio (SNR) for each subcarrier of the received symbol; and
   determine the metric using the instantaneous signal-to-noise ratio (SNR).

5. The system of claim 4, wherein the mutual information calculation element further comprises a buffer in which the metric is located.

6. The system of claim 5, wherein the processor receives the metric and determines whether the metric exceeds a threshold before providing the logic signal to signal receiver processing cessation.

7. A method for reducing power consumption in an Enhanced Forward Link Only (FLO-EV) a receiver, comprising:
   receiving a communication signal comprising at least one received symbol;
   providing at least one channel performance indicator corresponding to the received symbol;
   estimating a channel energy profile for the received symbol;
   generating an interference variance estimate for the received symbol;
   using the interference variance estimate and the channel estimate to derive a metric for the received symbol;
   determining whether the metric exceeds a threshold; and
   when the metric exceeds the threshold, providing a logic signal to signal receiver processing cessation.

8. The method of claim 7, further comprising
   normalizing the interference variance estimate using the at least one channel performance indicator.

9. The method of claim 7, further comprising:
   determining a channel energy profile per subcarrier of the received symbol.

10. The method of claim 7, wherein deriving a metric for the received symbol further comprises:
    determining an instantaneous signal-to-noise ratio (SNR) for each subcarrier of the received symbol; and
    determining the metric using the instantaneous signal-to-noise ratio (SNR).

11. The method of claim 10, further comprising buffering the metric.

12. A portable communication device, comprising:
    a receiver configured to receive a communication signal comprising at least one received symbol;
    at least one channel performance indicator corresponding to the received symbol;
    a channel parameter estimate element configured to provide a channel energy profile for the received symbol;
    an interference variance element configured to receive the at least one channel performance indicator and provide an interference variance estimate for the received symbol;
    a mutual information calculation element configured to receive the interference variance estimate and the channel estimate, the mutual information calculation element configured to develop a metric for the received symbol; and
    a processor element configured to receive the metric and provide a logic signal to signal receiver processing cessation when the metric exceeds a threshold.

13. The portable communication device of claim 12, wherein the interference variance estimate element further comprises:
    logic configured to normalize the interference variance estimate using the at least one channel performance indicator.

14. The portable communication device of claim 12, wherein the channel parameter estimate element further comprises:
    logic to determine a channel energy profile per subcarrier of the received symbol.

15. The portable communication device of claim 12, wherein the mutual information calculation element further comprises logic configured to:
   determine an instantaneous signal-to-noise ratio (SNR) for each subcarrier of the received symbol; and
   determine the metric using the instantaneous signal-to-noise ratio (SNR).

16. The portable communication device of claim 15, wherein the mutual information calculation element further comprises a buffer in which the metric is located.

17. The portable communication device of claim 16, wherein the processor receives the metric and determines whether the metric exceeds a threshold before providing the logic signal to signal receiver processing cessation.

18. A method for reducing power consumption in a portable communication device, comprising:
   receiving a communication signal comprising at least one received symbol;
   providing at least one channel performance indicator corresponding to the received symbol;
   estimating a channel energy profile for the received symbol;
   generating an interference variance estimate for the received symbol;
   using the interference variance estimate and the channel estimate to derive a metric for the received symbol;
   determining whether the metric exceeds a threshold; and
   when the metric exceeds the threshold, providing a logic signal to signal receiver processing cessation.

19. The method of claim 18, further comprising normalizing the interference variance estimate using the at least one channel performance indicator.

20. The method of claim 18, further comprising:
   determining a channel energy profile per subcarrier of the received symbol.

21. The method of claim 18, wherein deriving a metric for the received symbol further comprises:
   determining an instantaneous signal-to-noise ratio (SNR) for each subcarrier of the received symbol; and
   determining the metric using the instantaneous signal-to-noise ratio (SNR).

22. The method of claim 21, further comprising:
   buffering the metric.

23. A portable communication device, comprising:
   means for receiving a communication signal comprising at least one received symbol;
   means for providing at least one channel performance indicator corresponding to the received symbol;
   means for estimating a channel energy profile for the received symbol;
   means for generating an interference variance estimate for the received symbol;
   means for using the interference variance estimate and the channel estimate to derive a metric for the received symbol;
   means for determining whether the metric exceeds a threshold; and
   means for, when the metric exceeds the threshold, providing a logic signal to signal receiver processing cessation.

24. The portable communication device of claim 23, further comprising
   means for normalizing the interference variance estimate using the at least one channel performance indicator.

25. The portable communication device of claim 23, further comprising:
   means for determining a channel energy profile per subcarrier of the received symbol.

26. The portable communication device of claim 23, wherein the deriving a metric for the received symbol further comprises:
   determining an instantaneous signal-to-noise ratio (SNR) for each subcarrier of the received symbol; and
   determining the metric using the instantaneous signal-to-noise ratio (SNR).

27. The portable communication device of claim 26, further comprising:
   means for buffering the metric.

28. A computer program product, comprising:
   a non-transitory computer-readable medium comprising:
   code for causing a computer to receive a communication signal comprising at least one received symbol;
   code for causing a computer to provide at least one channel performance indicator corresponding to the received symbol;
   code for causing a computer to estimate a channel energy profile for the received symbol;
   code for causing a computer to generate an interference variance estimate for the received symbol;
   code for causing a computer to use the interference variance estimate and the channel estimate to derive a metric for the received symbol;
   code for causing a computer to determine whether the metric exceeds a threshold; and
   code for causing a computer to, when the metric exceeds the threshold, provide a logic signal to signal receiver processing cessation.

29. The computer program product of claim 28, further comprising:
   code for causing a computer to normalize the interference variance estimate using the at least one channel performance indicator.

30. The computer program product of claim 28, further comprising:
   code for causing a computer to determine a channel energy profile per subcarrier of the received symbol.

31. The computer program product of claim 28, wherein code for causing a computer to derive a metric for the received symbol further comprises:
   code for causing a computer to determine an instantaneous signal-to-noise ratio (SNR) for each subcarrier of the received symbol; and
   code for causing a computer to determine the metric using the instantaneous signal-to-noise ratio (SNR).

32. The computer program product of claim 31, further comprising:
   code for causing a computer to buffer the metric.

* * * * *